United States Patent Office 2,998,190
Patented Aug. 29, 1961

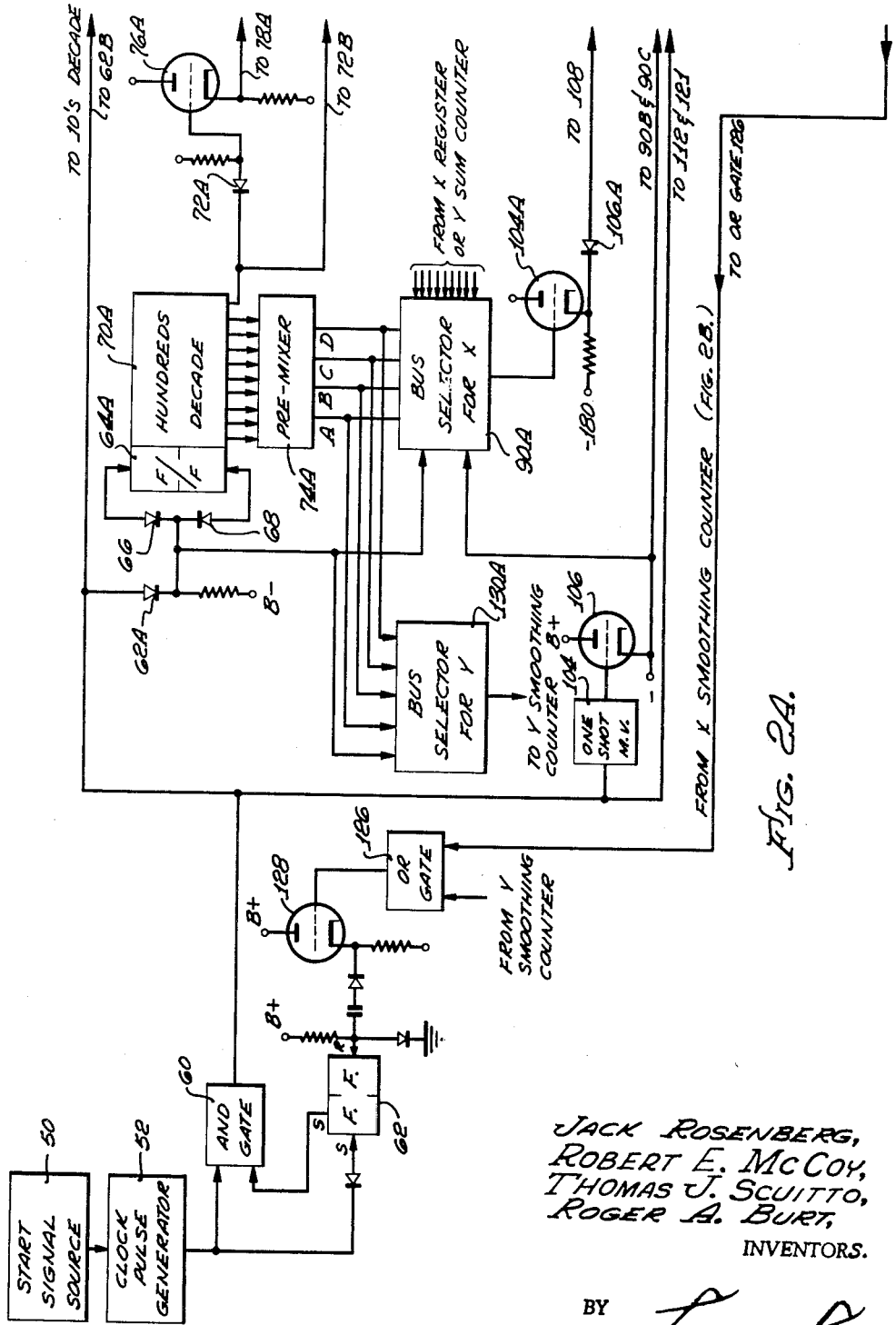

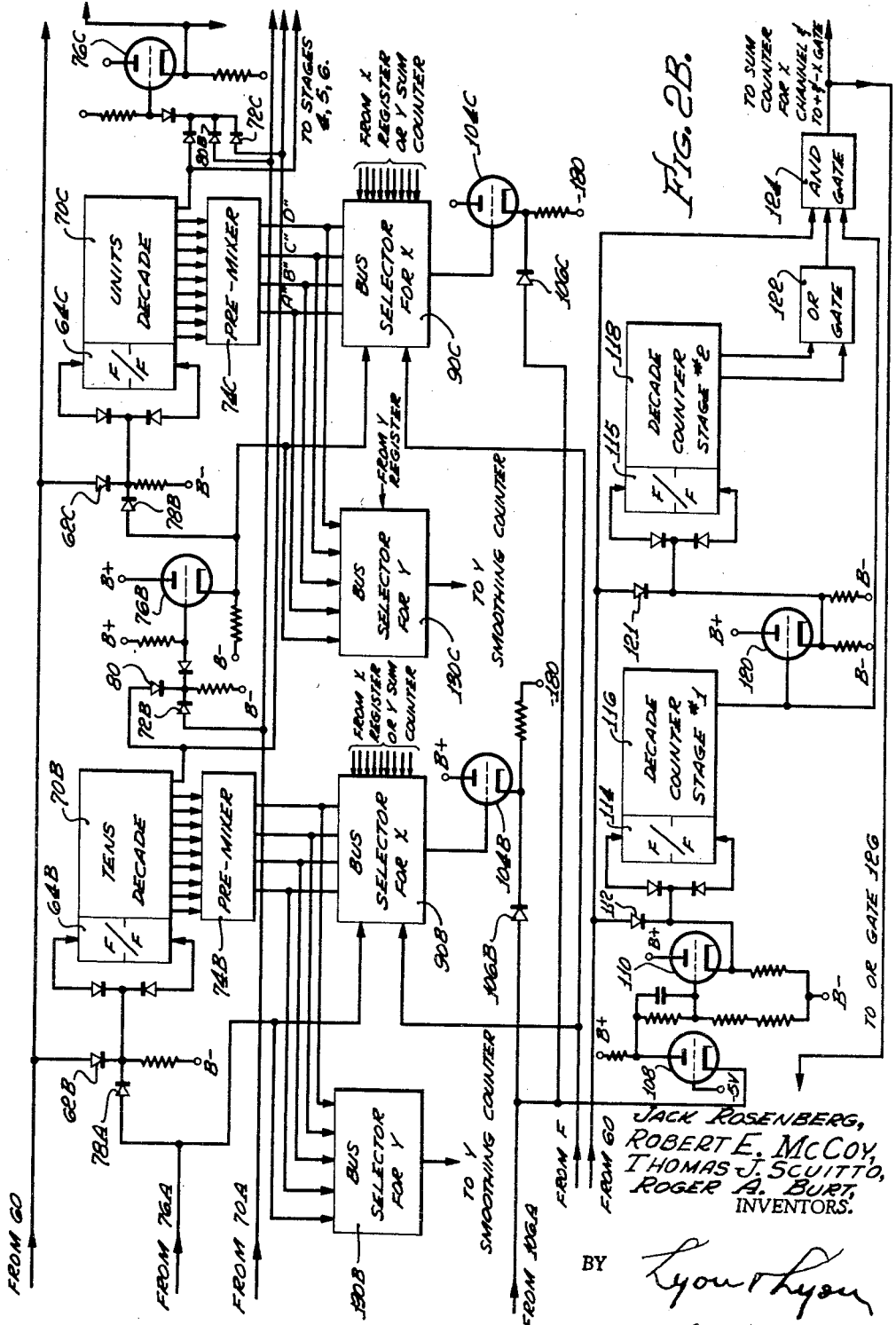

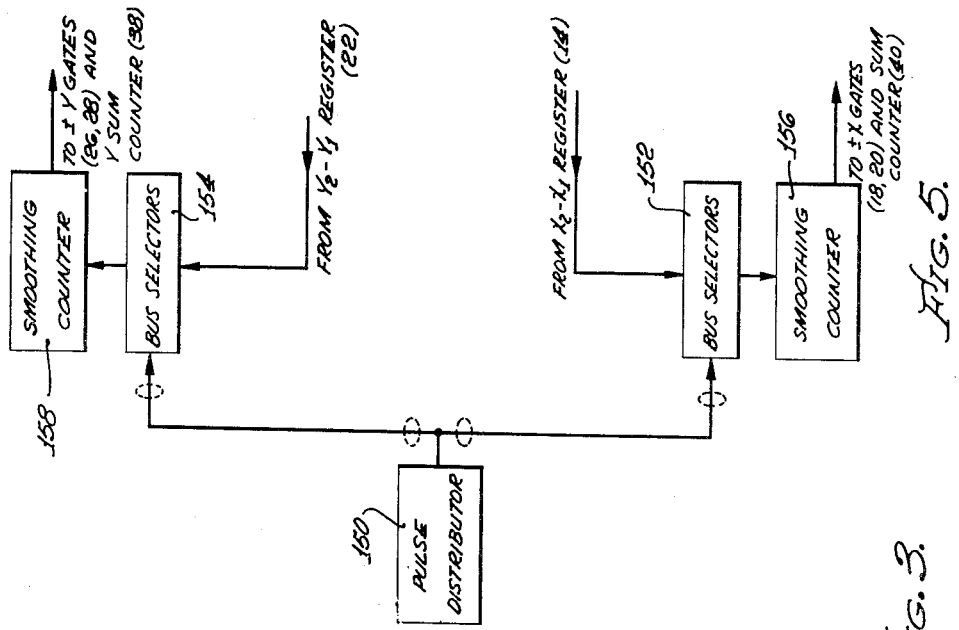
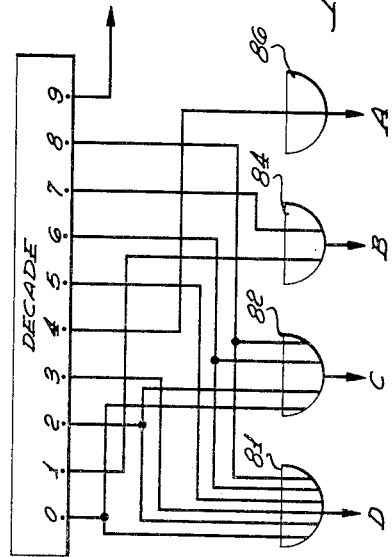
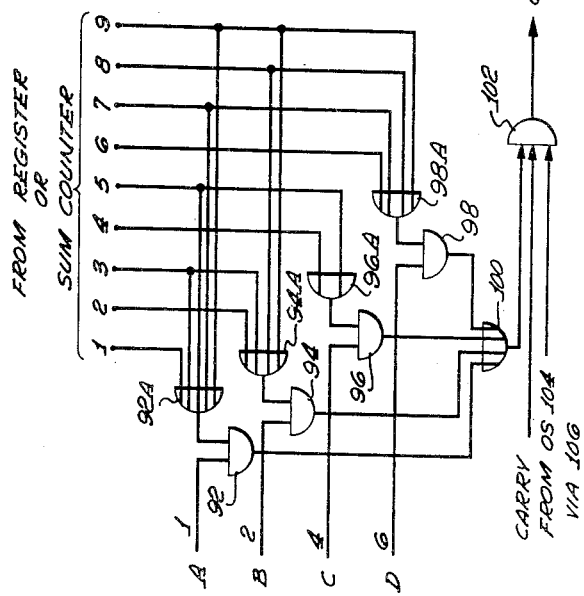

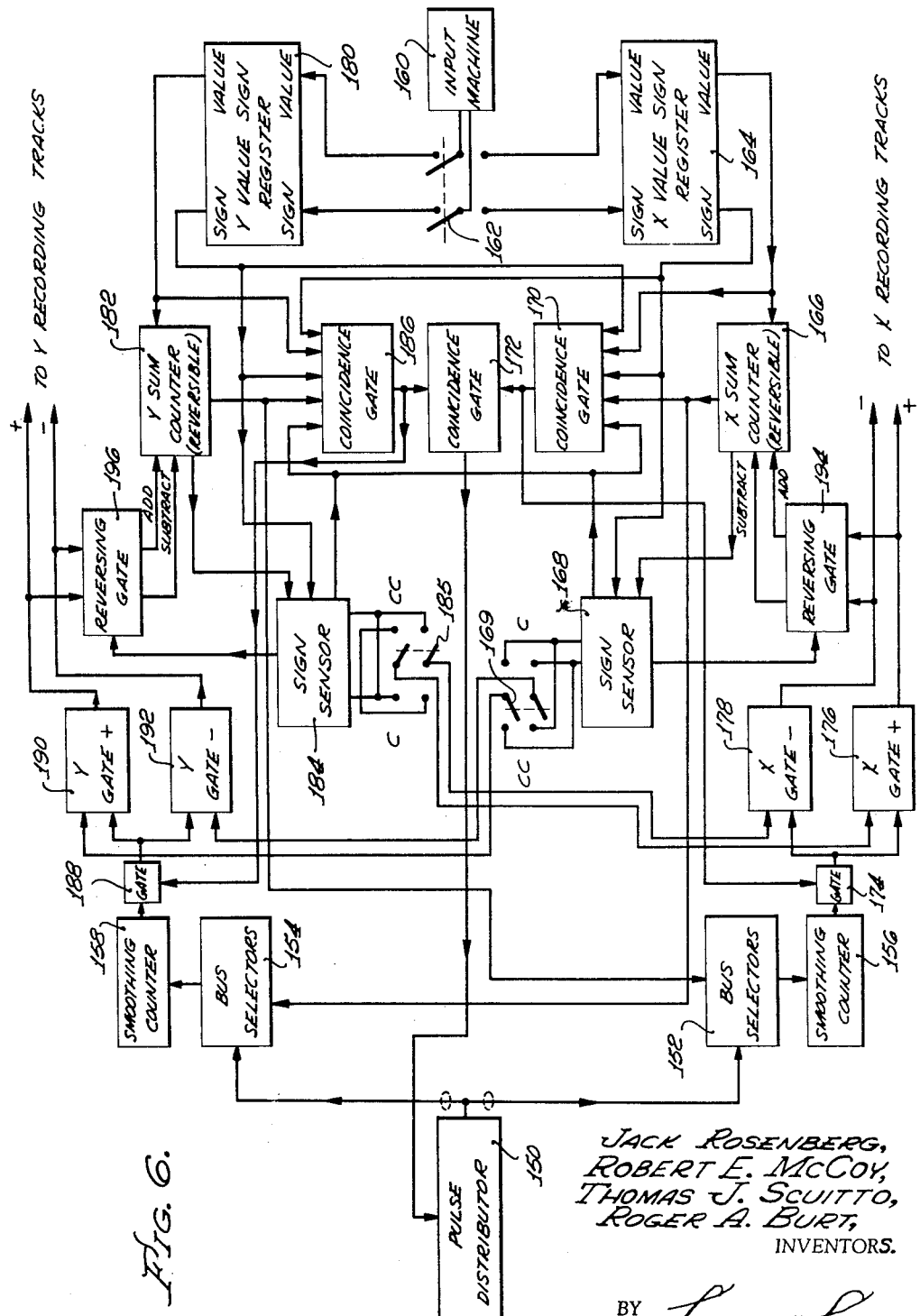

2,998,190
ACCUMULATOR
Jack Rosenberg, Pacific Palisades, Robert E. McCoy, Los Angeles, Thomas J. Scuitto, Santa Monica, and Roger A. Burt, Granada Hills, Calif., assignors to General Dynamics Corporation, Rochester, N.Y., a corporation of Delaware
Filed May 9, 1958, Ser. No. 734,220
7 Claims. (Cl. 235—151)

This invention relates to apparatus for deriving from a source of pulses a pulse train having a frequency which is determined by instructions applied to said apparatus. More particularly, this invention relates to an improved arrangement whereby pulses for commanding motion increments along co-ordinate axes for effectuating a desired resultant path may be derived from a source of clock pulses.

In an application for an Automation System, filed November 2, 1955, by Jack Rosenberg, Alexander F. Brewer, and Thomas J. Scuitto, Serial No. 544,478, now Patent No. 2,833,941, there is described and claimed an arrangement for generating pulse trains which can be employed for the purpose of commanding the motion of machine tools in a manner so that a desired operation may be accomplished. For example, it may be desired to move the table of a milling machine so that the cutting tool of the machine cuts a desired contour on a workpiece mounted on the table. Otherwise stated, a desired motion path may be ordered by means of these pulse trains which may be one of the contours on the workpiece as shown on a blueprint. The application describes apparatus for deriving pulse trains for ordering straight-line motion and also apparatus for deriving pulse trains for ordering motion in curved paths. In deriving these pulse trains for a two-co-ordinate system, it is shown that a source of periodic pulses, or clock pulses, is applied to two means, one of which by a process which may be termed division, divides the number of pulses obtained from the source by the differential of the equation of the desired motion path with respect to one co-ordinate. The second means divides the pulses received from the source simultaneously by the differential of the equation of the desired motion path with respect to the other co-ordinate.

The output pulses from the two means may either be directly utilized, or, preferably, are recorded for future utilization. The data for finding the differential for each path is obtained from the co-ordinates of the beginning and the ending of the path, if a straight line. If a circle, the co-ordinates of the center of the circle are also required. In each pulse train, each pulse represents an increment of motion along the co-ordinate axis. Each train of pulses contains as many pulses as there are increments of motion required along the co-ordinate, so that the resultant of directing motion simultaneously along the two co-ordinates provides a resultant motion which is the desired path. For a machine tool such as a milling machine, the table is thus directed to move to provide a desired cutting path on a workpiece.

In the system described, counter circuits were employed for performing the required division. It was found, however, that although the system operates satisfactorily and performs in the manner described, time is required for the counter circuits to either count to a predetermined number or to be filled, if operated as a predetermined counter, to provide the required number of pulses. Thus, with a large number of pulses required, or with spacing between the pulses in order to adequately describe the motion along a co-ordinate, a considerable amount of time may elapse until that pulse train has been generated.

In an application for an Accumulator, by Thomas J. Scuitto, Serial No. 676,888, filed August 7, 1957, now Patent No. 2,933,249, and assigned to a common assignee, an arrangement is shown and described for reducing the time required for deriving a pulse train of the type described from a clock-pulse source. This invention is another and different system for reducing the time required for deriving a pulse train from a clock-pulse source.

An object of this invention is to provide novel circuitry for reducing the time required for deriving a pulse train of the type described from a clock-pulse source.

Another object of the present invention is the provision of novel and useful circuitry for deriving pulses from a clock-pulse source in accordance with desired control information.

Still another object of the present invention is the provision of a simple arrangement which effectively reduces the time required for obtaining a pulse train of the type described.

These and other objects of the invention are achieved in an arrangement wherein a counter is employed into which clock pulses are entered. A decimal counter is employed, having a plurality of decade counting stages. However, instead of an ascending order, the order of the decade stages is reversed. The first decade into which clock pulses are inserted for counting is considered as the highest-order decade, and the subsequent decade stages which are actuated by carryover pulses are considered in a descending decade order. Each decade has a plurality of busses associated with it. Means, called a premixer, are provided for actuating associated busses of a decade with different count outputs from that decade. The premixer functions in a manner so that when a decade cycles through a ten count, any number of pulses from 1 through 9 may be derived from the associated bus lines. These busses are connected to apparatus identified as a bus selector.

It was previously indicated that it is desired to derive a train of pulses from a source of clock pulses in response to a number which may represent a path length along a co-ordinate axis. In the present invention, each bus selector, which is associated with a decade counter stage, is actuated by a digit in a corresponding digit position of said number to provide as its output an equivalent number of pulses. For simplification, if the number was 752, then the respective bus selectors derive 7, 5, and 2 pulses from the bus lines. These pulses are derived repetitively and are then applied to a smoothing counter, the output of which is a train of pulses which occur uniformly spaced and at a higher rate than the same train of pulses could be derived from the previously known frequency-dividing technique.

The novel features that are considered characteristic of this invention are set forth with particularly in the appended claims. The invention itself, both as to its organization and method of operation, as well as additional objects and advantages thereof, will best be understood from the following description when read in connection with the accompanying drawings, in which:

FIGURES 2A and 2B are block diagrams of an embodiment of the invention;

FIGURE 3 is a block diagram of a premixer circuit employed in the embodiment of the invention;

FIGURE 4 is a block diagram of a bus selector circuit employed in the embodiment of the invention;

FIGURE 5 is a block diagram of the modifications required for a straight-line function generator to employ this invention; and FIGURE 6 is a block diagram of a circle control-pulse generator which is modified in accordance with this invention.

Figure 1:
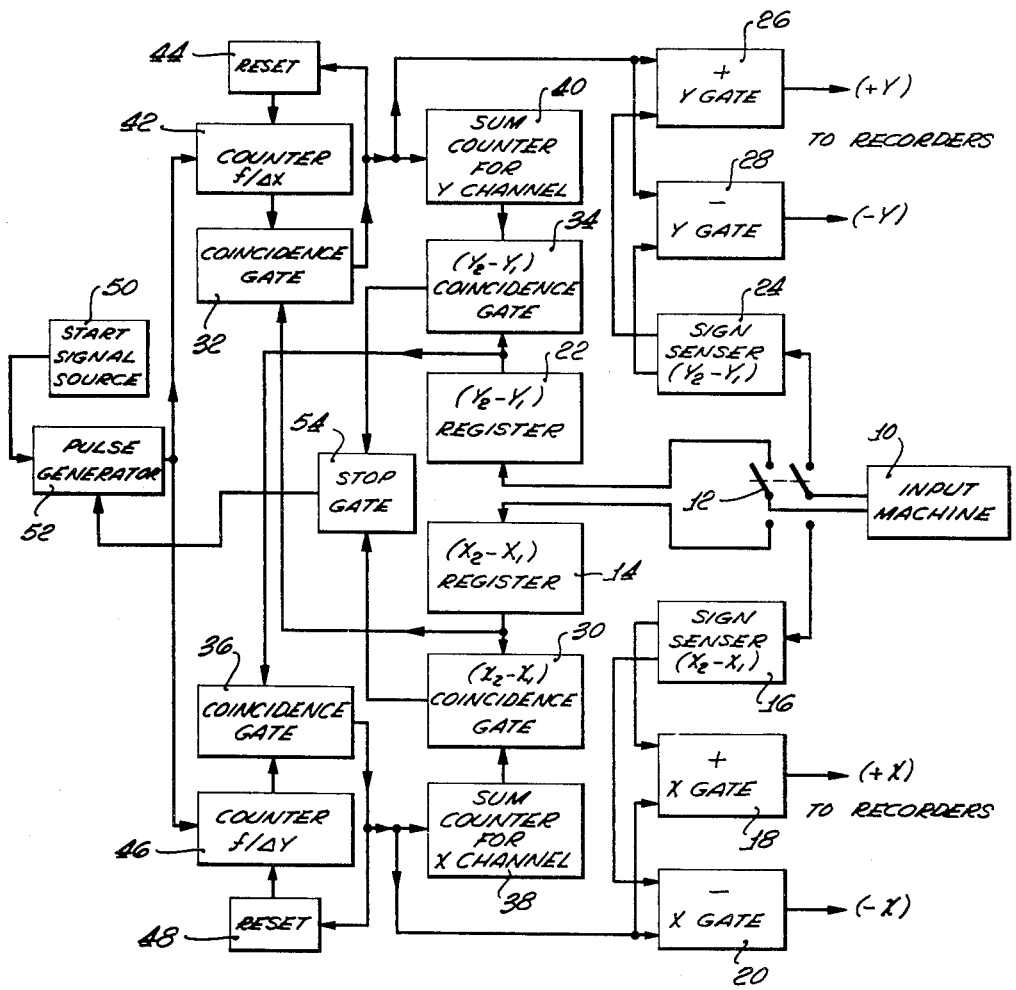
FIGURE 1 is a block diagram of a straight-line control-pulse generator shown to assist in an understanding of the invention.

From elementary algebra, it can be established that the formula of a straight line is $y=mx+b$. The slope of a straight line can be obtained by differentiating $y$ with respect to $x$, whereby $$\frac{dy}{dx}=m$$

is obtained; $m$ is the value of the slope which for any given straight line is a constant. Now let us consider a rectangular co-ordinate system having the co-ordinates $x$ and $y$, wherein a line having the slope $m$ extends between two points, one of which is $x_1, y_1$, and the other of which is $x_2, y_2$. It can readily be shown that $$m=\frac{y_2-y_1}{x_2-x_1}$$

which is equal to $$\frac{\Delta y}{\Delta x}$$

Therefore, $\Delta y = y_2 - y_1$ and $\Delta x = x_2 - x_1$. From this, it can be concluded that to go from one end of a straight line to the other end of the straight line along the straight line, a simultaneous motion along the $x$ and $y$ axis in the relationship $$\frac{\Delta y}{\Delta x}$$

will provide a resultant motion following the desired path. It should be noted that $x_2-x_1$ is the projection of the straight line on the $x$ axis and $y_2-y_1$ is the projection of the straight line on the $y$ axis.

In the previously referred to application by Rosenberg et al., there is shown how to obtain a control-pulse train for each axis of a co-ordinate system, which may be employed to direct motion along each axis to obtain a resultant motion which is the desired path. If, for example, a milling machine is to be controlled to provide a desired cut on a workpiece if the co-ordinates of the beginning and ending of the cutting path are known, the table of the machine may be directed simultaneously to move distances along the respective two co-ordinate axes as expressed by the differences $(x_2-x_1)$ and $(y_2-y_1)$ to effectuate the desired resultant cutting path. Such control of the table motion may be made by simultaneously driving the lead screws for each co-ordinate in response to a train of pulses. In response to a pulse, an increment of table motion is made to occur which may be on the order, for example, of 0.001 inch. Accordingly, a pulse train will have as many pulses as there are required increments of motion. Thus, if a straight-line cut of 10" long, for example, the x-axis is required, then 10,000 pulses would be required in the pulse train. Similarly, if a straight-line cut of 5" along the y-axis is required, then 5,000 pulses are required in the y-axis pulse train. It should be appreciated that in order to make a desired straight-line cut having a desired slope, both co-ordinate motion screws are simultaneously driven from the separate pulse trains. In the illustration employed, with a simultaneous motion of 5" along the y-axis and 10" along the x-axis, a straight line having a slope of 0.5 would be provided.

It is shown in the previously referred to application by Rosenberg et al. that in a blueprint a required cut may be referenced to two base lines which are relatively rectangularly disposed. These serve as co-ordinate axes from which $x_2-x_1$ and $y_2-y_1$ may be readily determined. It is known that the output of a pulse generator may be readily divided by a counter. Thus, if pulses from a pulse generator are applied to two counters, from each of the counters there may be derived the train of pulses which equals the input divided by the count of the counter. Expressed another way, the pulse rate $f$ of the generator is divided by the scale of the counter. If one counter is set to divide its input $f$ by $\Delta y$ and the other counter is set to divide its input $f$ by $\Delta x$, there will emerge from the $\Delta x$ counter a train of uniformly spaced pulses at one rate, $$\frac{f}{\Delta x}$$

while from the $\Delta y$ counter will emerge a train of uniformly spaced pulses at another rate, $$\frac{f}{\Delta y}$$

The ratio between the two rates is $$\frac{\frac{f}{\Delta x}}{\frac{f}{\Delta y}}=\frac{\Delta y}{\Delta x}=\frac{y_2-y_1}{x_2-x_1}$$

This is exactly the slope of the desired cut between points $x_1, y_1$ and $x_2, y_2$.

The two output-pulse trains derived from the respective dividing counters may be recorded on two separate tracks on magnetic tape. These two tracks are simultaneously read and the outputs derived are applied to the motors controlling the lead screws driving the milling-machine table. Thus, as far as the pulse trains are concerned, two things are important. First, the correct number of pulses must be derived to move the correct distance. Second, for proper slope control, since $x$ and $y$ motions are made to occur together, the relative occurrence of the pulses is important.

It should be appriciated that the frequency of the clock-pulse generator has no effect on the slope and, as seen from the mathematics, cancels out in the final equation. The frequency of the clock-pulse source, however, is of concern in establishing the time required to generate the pulse trains. Thus, in the above example, it is the time required to generate a pulse train having 10,000 pulses that fixes the minimum time which can be allowed for generating control pulses. This means that if the clock-pulse generator operates at a frequency of 500,000 cycles per second, one counter (the $\Delta x$ counter) is set to count 10,000 and provides an output for every 10,000 pulses counted. The $\Delta y$ counter is set to count 5,000 and provides an output for every 5,000 pulses counted. The output of the $\Delta y$ counter establishes the pulse train for directing motion along the $x$ co-ordinate axis and the output of the $\Delta x$ counter establishes a pulse train for controlling motion along the $y$ co-ordinate axis. The $\Delta x$ counter will provide an output pulse every $\frac{1}{50}$ of a second, and, since 10,000 of these are required, it will require three and one-third minutes of operating time for completion. It can thus be seen that where a long series of different paths must be performed, the time of operation of the system is not as rapid as is desired. Increasing the clock frequency to provide a more rapid operation of the system is not a very effective method, since the amount of correction which can be obtained is limited by the speed of counters, gates, and other associated apparatus required.

FIGURE 1 is a block diagram of a straightline control-pulse generator, which is shown to assist in an understanding of this invention. This straight-line control-pulse generator is described and claimed in the previously noted application to Rosenberg et al. As pointed out previously, information required for generating the co-ordinate ($x$ and $y$) pulse trains which may be employed for machine-tool control is derived from the blueprints containing the desired path which may be the edge of the particular piece which is to be cut, or may be the line between the centers of holes which are to be drilled. In any event, this path has a beginning and an ending. The beginning of the path is identified by co-ordinates $x_1, y_1$ and the end of the path is designated by co-ordinates $x_2$, $y_2$. The slope of a straight line may be negative, as well as positive. This may readily be determined by the sign of the remainder when $x_1$ is subtracted from $x_2$. To calculate $x_2-x_1$ and $y_2-y_1$, a machine such as an adding machine may be employed. This is designated in FIGURE 1 as an input machine 10. First, for example, $x_2-x_1$ is calculated, and the switch 12 is connected to enter this amount into the $x_2-x_1$ register 14. Whether the sign of this difference is positive or negative is entered into the sign senser 16. If positive, sign senser 16 will open plus-$x$ gate 18. If negative, the sign senser 16 will enable, or open, a minus-$x$ gate 20.

The switch 12 is then thrown to connect the input machine to the $y_2-y_1$ register 22 and also to the $y_2-y_1$ sign senser 24. The difference $y_2-y_1$ is entered into the register 22 and its sign into the sign senser 24. Thus, either the plus-$y$ gate 26 or the minus-$y$ gate 28 will be enabled in response to the sign of the difference $y_2-y_1$. The number which is entered into the $x_2-x_1$ register 14 is also established in a first $x_2-x_1$ coincidence gate 30 and into a second coincidence gate 32. The number in the $y_2-y_1$ register 22 is also entered into a first $y_2-y_1$ coincidence gate 34 and a second coincidence gate 36. The coincidence gate 30 monitors the count in the sum counter for the $x$ channel 38 and provides an output as soon as the sum counter 38 reaches the count equal to $x_2-x_1$ in the coincidence gate 30. Similarly, the $y_2-y_1$ coincidence gate 34 monitors the count in the sum counter for the $y$ channel 40. It provides an output when the count in the sum counter 40 equals the number $y_2-y_1$.

The second coincidence gate 32 monitors the count in a dividing counter 42, designated as the $$\frac{f}{\Delta x}$$

dividing counter. When this dividing counter has counted to the number in the $x_2-x_1$ register, the coincidence gate senses this and emits an output which is applied to a reset circuit 44, which resets the dividing counter 42. The coincidence gate 32 output is also applied to the sum counter 40 to increase its count by one and is also applied to the plus-$y$ and minus-$y$ gates. Coincidence gate 36 monitors the count in the divide counter 46, designated as the $$\frac{f}{\Delta y}$$

divide counter. When the count in the divide counter 46 equals the number $y_2-y_1$, the coincidence gate 36 emits a pulse which is applied to the reset circuit 48 to reset the divide counter to zero. This reset pulse is also applied to the sum counter 38 to increase its count by one and also to the plus- and minus-$x$ gates 18 and 20.

The operation of this system is as follows: After the values of $x_2-x_1$ and $y_2-y_1$ have been entered into the respective register 14 and 22 and their respective signs have been entered into the sign sensers 16 and 24, a start-signal source 50, which may consist of an energizing switch, applies a start signal to a pulse generator 52, which operates at a frequency "$f$." Pulse generator 52 is alternatively identified herein as the clock-pulse source. Its output is applied simultaneously to the two divide counters 42, 46. The counters increase their count by one for every clock pulse entered therein. Suppose, for example, that the number in the $x_2-x_1$ register is 10,000; then when the counter 42 attains the count of 10,000, the coincidence gate 32 provides an output pulse which resets the divide counter 42 to zero, which output pulse increases the count of the sum counter 40 by one. If the sign of $y_2-y_1$ (as stored in sign senser 24) is positive, then the plus-$y$ gate is enabled and it will apply its output pulse to subsequent recording or control apparatus, as desired. Suppose, further, that the number $y_2-y_1$ is 5,000; then when the sum counter 40 finally counts 5,000 pulses, the coincidence gate 34 will sense this fact and apply its output to the stop gate 54. With the number in the $y_2-y_1$ register equal to 5,000, then when counter 46 attains a count of 5,000, coincidence gate 36 will provide the pulse which enables the reset circuit 48 to reset counter 46 and which adds one to the count in the sum counter 38 and which will be emitted by either the plus-$x$ or minus-$x$ gate in accordance with the sign of the $x_2-x_1$ number.

When the sum counter 38 counts 10,000, the coincidence gate 30 senses this condition and will apply its output to the stop gate 54. Since the output of the $y_2-y_1$ coincidence gate 34 also occurs at this time, the stop gate 54 is enabled to apply a pulse to the pulse generator to stop it from emitting further pulses to the divide counters. For the next path, the input machine 10 is again employed to enter the next set of differences and their signs, and the system is again energized to generate the two trains of control pulses, as required.

It is proposed herein to replace both dividing counters 42, 46, both coincidence gates 32, 36, and both reset circuits 44, 48 by the structure to be described. This enables the generation of the requisite control-pulse trains in a much shorter interval of time than is possible with the equipment described.

FIGURES 2A and 2B are a combined block and circuit diagram of an embodiment of the invention. This will include a start-signal source 50 and a pulse-generator 52, as before. The output of this is applied to an AND gate 60 and also to set a flip-flop 62. The turnover time of the flip-flop is sufficient so that the AND gate 60 will only pass pulses after the pulse which sets the flip-flop. The output of the AND gate, consisting then of clock pulses, after the first, is applied to a counter. A preferred type of counter is a decimal counter wherein the counter will comprise a number of decade stages. A suitable and inexpensive type may be the kind which employs a beam-switching tube for each decade. These tubes are commercially available—for example, they are sold by the Haydu Brothers of New Jersey, a subsidiary of the Burroughs Corporation. A suitable arrangement for a decimal counter of this type is found, described, and shown in an application by Jack Rosenberg, Alexander F. Brewer, and Thomas J. Scuitto, for a Reversible Decade Counter, filed December 28, 1956, Serial No. 631,336, now Patent No. 2,964,241.

The output of the AND gate 60 is applied to a plurality of diodes 62A, 62B, 62C, which are connected in parallel. However, only the first diode 62A will operate to apply the negative pulse to the following circuits, since the others are portions of coincidence or AND gates, which require the presence of a carry pulse from a preceding decade, in order to pass the pulse received. The negative pulse output of the diode 62A, therefore, is applied to a following flip-flop circuit 64A. This flip-flop circuit is of the well-known type which has two stable conditions, and can be driven from one to the other of these stable conditions by an input which is applied to the junction of two diodes 66, 68. These two diodes 66, 68 are connected to the inputs to the flip-flop, which, depending on its condition of stability, biases one or the other of these diodes off, enabling the flip-flop circuit to be driven in response to an input pulse from whatever condition of stability it had to the opposite condition of stability.

The output of the flip-flop circuit 64A is applied to the succeeding beam-switching tube decade 70A. Contrary to the usual ascending order of decades in a counter, here the first, or input, decade 70A is considered to have the most significant value. Since, by way of example, a three-stage decade is being shown here, instead of the respective decades 70A, 70B, 70C having units, tens, and hundreds significance, they have a hundreds, tens, and units significance. The decades 70B and 70C are respectively driven from flip-flops 64B and 64C, which are similar to flip-flop 64A.

The hundreds decade will provide an output pulse as it is sequenced for each count condition that it assumes. Thus, assuming the decade is initially in its zero count condition, in response to nine input pulses, it is sequenced through nine count states and will provide nine output pulses, the ninth of which is applied to diodes 72A, 72B, and 72C in parallel. The tenth pulse applied to the hundreds decade will drive it from its nine to its zero count condition. All the outputs of the hundreds decade are connected to circuitry represented by the rectangle 74A and called a premixer. The tens decade also has a premixer 74B which is identical with that of the hundreds decade, and the units decade has an identical premixer 74C.

The diode 72A is connected to the grid of a cathode-follower tube 76A, which, in response to the negative-pulse input applied to its grid, in turn, will apply a pulse to a diode 78A from its cathode. Diodes 78A and 62B have their cathodes connected through a resistor to a negative-potential bias source, thus forming a coincidence gate, or AND gate, requiring that negative pulses be applied to both of them simultaneously before a negative output can be derived at their juncture. When the hundreds decade is driven to its ninth count condition, the diode 78A will have a negative voltage applied thereto, which will remain until the hundreds decade is driven to zero again. The next clock pulse from the AND gate 60 for performing this function is applied to both the diode 62A as well as 62B. Both flip-flops 64A and 64B are driven which, in turn, serve to advance the count of the tens decade by one and the hundreds decade 70A to its zero count condition. The flip-flop 64B is driven before the pulse applied to diode 62A has a chance to advance the hundreds decade 70A away from its nine-count condition.

The tens decade 70B, when reaching its ninth count condition, will also apply an output to a diode 80. Diodes 72B and 80 also serve as a coincidence gate, requiring the presence of a nine count from decade 70A and from decade 70B before an output pulse can be applied to the grid of a cathode-follower tube 76B. The cathode-follower tube will then apply an output to a diode 78B, which, together with the diode 62C, acts as a coincidence gate. Upon the occurrence of the next output from AND gate 60, this coincidence gate is enabled to drive the succeeding flip-flop 64C, which, in response, will advance the count in the units decade by one count. Were more stages to be employed, then of course the system just described for carryover can be extended to these stages.

Attention is now directed to FIGURE 3 of the drawings, which is a block diagram of an arrangement for any one of the premixers 74A or 74B or 74C. Assume for simplicity in explanation that the terminals labeled 0 through 9 are the output terminals of a decade stage. Then outputs 0, 2, 3, 5, 6, and 8 are brought to an OR gate 81. The OR gate is well-known circuitry which provides an output when any one of its inputs is energized. Thus, an output from OR gate 81 is obtained whenever the hundreds decade attains any one of the counts to which the OR gate input is connected. Therefore, the OR gate 81 will provide six output pulses as the decade performs one counting cycle in response to receiving ten input pulses. An OR gate 82 is connected to the 0, 2, 6, and 8 outputs of the decade and thus will provide four pulses during a counting cycle. An OR gate 84 is connected to the 1 and 7 outputs of the decade, and thus will provide two output pulses over a count cycle. An OR gate 86 is connected to the number four output of the decade and thus will provide only one output pulse as a result of the decade passing through a counting cycle.

From the description which has been given thus far, it should be apparent that the output of each decade counter stage is applied to a premixer circuit, which comprises the four OR gates 80, 82, 84, 86 and their connections to the decade outputs. The output of the premixer is applied to four busses, respectively designated by A, B, C, D, respectively providing 1, 2, 4, and 6 pulses during an associated decade counting cycle. The output occurring on the ninth count is used for priming the carryover AND gates.

Referring back to FIGURES 2A and 2B, the four busses A, B, C, D—A', B', C', D'—A'', B'', C'', D'', respectively connect each premixer 74A, 74B, 74C to respective bus selector circuits 90A, 90B, and 90C. The output of the bus selector will consist of a number of pulses corresponding to the value of the digit in the corresponding digit position of the number in the X register (FIGURE 1), for example.

FIGURE 4 is a block diagram showing a typical arrangement for a bus selector. It will include four AND gates 92, 94, 96, 98, respectively having as one input one of the busses A, B, C, D, and as a second input the output of an associated OR gate 92A, 94A, 96A, and 98A. If the bus selector shown in FIGURE 4 is the one associated with the hundreds decade, the respective inputs (numbered 1 through 9) to the OR gates 92A, 94A, 96A, 98A, in the case of the straight-line computer shown in FIGURE 1, are derived from the digit stored in the hundreds portion of the register 14. If the bus selector in FIGURE 4 is the one associated with the tens decade, then the inputs, respectively numbered 1 through 9 in FIGURE 4, would be actuated by whatever digit representation was stored in the tens portion of the register 14.

It should be appreciated that in any one bus selector only one of the bus-selector inputs, respectively numbered 1 through 9, is actuated from a register. This input is the one corresponding to the value of the digit stored in the register. The OR gate 92A can receive an actuating input from any one of input terminals 1, 3, 5, 7, and 9. The OR gate 94A can receive an actuating input from any one of terminals numbered 2, 3, 8, and 9. The OR gate 96A can receive an actuating input from any one of the terminals numbered 4 and 6. The OR gate 98A can receive an actuating input from any one of the terminals numbered 6, 7, 8, and 9.

To illustrate the operation of the bus selector, assume that its number 7 input is actuated. Then OR gate 92A enables AND gate 92 to provide an output whenever the A bus is actuated, and OR gate 98A enables AND gate 98 to provide an output each time the D bus is actuated. Accordingly, during the count cycle of a decade, the output of the AND gates 92 and 98 will total seven pulses equal to the number of the actuated input. The output of the AND gates 92, 94, 96, and 98 are applied to an OR gate 100. The number of pulses collected by the OR gate 100 equals the number of the actuated input. The output of this OR gate is applied to an AND gate 102.

AND gate 102 is a three-input AND gate. It has a second input, which may be called a carry input. In the case of the bus selector 90A, this carry input is the input which drives flip-flop 64A. In the case of the bus selector 90B, the carry input is the output of the cathode-follower tube 76A, which is enabled in the presence of a carry pulse. In the case of the bus selector 90C, the carry input is the output of the cathode-follower tube 76B, which is also enabled in the presence of a carry-pulse input from the preceding counter stages. A third input to the AND gate 102 is received from a one-shot multivibrator 104 (FIGURE 2A). The one-shot multivibrator is driven each time a clock pulse is received from AND gate 60, and its output is applied through a cathode-follower 106 to all the bus selectors for the purpose of obtaining a better rectangular wave shape output from the AND gate 102 in each one of the bus selectors. Accordingly, from what has been described, the AND gate 102 will provide as its output a pulse which occurs when there is a coincidence of inputs respectively from the OR gate 100, a carry-pulse input, and an output from the one-shot multivibrator 104. For each decade counting cycle, the output of the AND gate 102 will consist of a train of pulses, with the number of pulses in such train equaling the number stored in the associated digit portion of a register energizing an input terminal to the bus selector.

By way of comparison with FIGURE 1, assume that register 14 has stored therein the number 752, while register 22 has stored therein 805. Then counter 42 has to count 752 pulses before producing an output pulse, while counter 46 has to count 805; a total of 605,360 clock pulses are required to produce 805 output pulses from counter 42 and (in the same interval) 752 output pulses from counter 46. With the present invention, however, only 1000 clock pulses are required; then, for every 1000 clock pulses applied to the counter, consisting of the stages 70A, 70B, and 70C, the bus selector 90A would emit seven hundred pulses, the bus selector 90B would emit fifty pulses, and the bus selector 90C would emit two pulses. Therefore, 752 pulses can be applied with the arrangement shown to the sum counter.

As thus far described, the arrangement shown in FIGURE 2 is suitable for use for obtaining a pulse train for only one co-ordinate. For obtaining pulse trains for additional co-ordinates, the same counter and premixers may be employed, but additional bus selectors, such as 130A, B, C, are required for each co-ordinate. Thus, pulse trains from the two systems occur relative to one another to provide the proper timed ratio of control pulses. The number of pulses required are collected in a much shorter interval of time than with the previous system. However, the pulses which are emitted from the arrangement shown in FIGURE 2 herein do not occur at a rate which is deemed sufficiently uniform to obtain desirable results with the subsequent machine being controlled. Experience with these kinds of systems has shown that when the control pulses do not occur at what may be termed a substantially uniform rate, an optimum operating result is not obtained. Therefore, to avoid this, and in view of the fact that there is such a considerable saving of time by the arrangement described, some of it may be employed to achieve smoothing in the flow of pulses to the summing counter and for recordation for use in control.

To effectuate such smoothing, the output of each bus selector as shown in FIGURE 2 is applied respectively to a cathode-follower tube 104A, 104B, 104C. The output of each cathode-follower tube is connected to an OR gate, comprising the respective diodes 106A, 106B, and 106C. These three diodes are connected together and to the cathode of a tube 108. The anode of tube 108 is connected to the grid of a cathode-follower tube 110. Tube 108, in the quiescent condition, is maintained non-conducting. Tubes 104A, 104B, 104C, in the quiescent condition, are conducting, maintaining the respective diodes 106A, 106B, 106C cut off or blocked. Should a negative pulse be applied to the control grid of any one of the tubes 104A, 104B, 104C, the cathode of that tube will go negative, enabling the associated diode to conduct current which is drawn through tube 108, whereupon a negative pulse may be derived from the plate of tube 108. This is applied to the control grid of tube 110, which in its quiescent condition is maintained conductive. The cathode of tube 110, in response to the negative-pulse input, will be driven negative.

A clock pulse from the AND gate 60 is also applied to the cathode of tube 110 through a diode 112. The purpose of this circuitry is to again shape and time the output of cathode-follower tube 110, so that the following driver flip-flop 114, which is similar to those bearing reference numerals 64A, B, or C, will be properly driven.

Should a clock pulse not occur at the time an output is received from tube 110, diode 112 acts as a clamping diode and conducts current, whereby the output of cathode-follower tube 110 is prevented from being applied to the following flip-flop 114. However, should a clock pulse be applied to diode 112, since such clock pulse is negative, diode 112 is prevented from conducting and the negative output of the cathode-follower tube 110 can therefore be applied to the flip-flop 114 to drive it and accordingly drive the following counter stage 116.

The decade counter stage 116 is similar to those previously described and is part of the smoothing counter, to which the outputs of the bus selectors are all applied. The second stage of the counter is decade stage 118. The ninth count output of the decade counter stage 116 is coupled to a cathode-follower tube 120. Upon the occurrence of a clock pulse, as well as output from cathode-follower tube 120, the flip-flop 115 is driven, whereby decade counter stage 118 is advanced one count. The operation just described for each cathode follower 110 and diode 112 also obtains for a cathode-follower tube 120 and diode 121. Despite the fact that the cathode-follower tube 120 has a 9-count output applied to its grid, this is not applied to the following flip-flop 115 until diode 121 is rendered nonconductive by the application of a negative pulse thereto.

The number −4 and −9 counts of decade counter stage 118 are connected to an OR gate 122. The output of this OR gate is connected to an AND gate 124. The inputs to this AND gate will consist of the number −9 count output from decade counter stage 116, a clock pulse, and the output of OR gate 122. The output of AND gate 124 is applied to the succeeding sum counter, to the recording equipment, and also to an OR gate 126. The output of OR gate 126 is applied to a cathode-follower tube 128. The output of cathode-follower tube 128 is connected to reset flip-flop 62. This will close AND gate 60. The next clock pulse from the pulse generator 52 will set flip-flop 62, enabling AND gate 60 to hereafter pass the following clock pulse. Effectively, flip-flop 62 delays the operation of the system one clock-pulse interval, in order to allow the following sum counter and recordation apparatus time to operate.

The decades 116 and 118 will provide, with the arrangement shown, an output pulse for every 50 input pulses. This has the effect of smoothing the flow of pulses to the sum counter and to the channel on tape on which it is recorded. For a two or more axis system, no duplication of the input counters or their associated premixers is required. A duplication of the equipment shown thereafter, however, is required. Considering, by way of illustration, a two-axis system, the bus selector 130A would be connected to the output of premixer 74A, the bus selector 130B would be connected to the output of premixer 74B, and the bus selector 130C would be connected to the output of the premixer 74C. The output of these premixers would thereafter be applied to duplicate the structure to that shown in FIGURE 2, following the bus selectors, including the OR gate and accumulator counter.

Attention is now directed to FIGURE 5 of the drawings, which shows in block diagram form so much of the modification required of the straight-line control-pulse generator shown in FIGURE 1 when the embodiment of the invention is inserted therein, as to further assist in an understanding hereof. The input (FIGURE 1) from the input machine 10 into the register 14, the register 22, and the respective sign sensers 16 and 24, will be the same as was described previously. The functioning of the $y_2-y_1$ coincidence gate 34 in sensing the coincidence of the sum counter 40 count with the number in the $y_2-y_1$ register remains as previously described. Similarly, the function of the $x_2-x_1$ coincidence gate 30 sensing the count coincidence of the amount in the sum counter 38 with the amount in the $x_2-x_1$ register 14 is also the same as was previously described. Both coincidence gate outputs are applied to the stop gate 54 to stop the clock-pulse generator 52 at the proper time.

The changes in the control-pulse generator effectuated by this invention include the use of a pulse distributor 150, which represents the clock-pulse generator 52, the counters 70A, 70B, 70C, and the premixers 74A, 74B, 74C shown in FIGURES 2A and 2B. The bus-line outputs of the distributor are connected to the bus selectors 152 for the y-co-ordinate and the bus selectors 154 for the x-co-ordinate.

These bus selectors 152, 154 respectively represent the bus selectors 90A, 90B, 90C and 130A, 130B, 130C, shown in FIGURES 2A and 2B. The instruction input to bus selectors 154 is derived from the $y_2-y_1$ register 22. The instruction input to the bus selectors 152 is derived from the output of the $x_2-x_1$ register 14. It will be appreciated that the respective registers may comprise relay registers, or electronic circuitry such as the well-known flip-flop decade counters or decade tubes of the type described as beam-switching tubes. In any event, the number in each digit position in a register is used to instruct each bus selector to select a number of pulses from the bus lines equal to the number in the digit position under consideration.

The bus selector outputs are respectively inserted into the smoothing counters 158, 156. Each smoothing counter includes the structure of the decade counter stages 116, 118 and the associated logic shown in FIGURES 2A and 2B. The output of each smoothing counter 158, 156 will be applied to its respective sum counter 38, 40 and also to the respective plus and minus y gates 26, 28 and plus and minus x gates 18, 20.

The system shown can also be extended for generating control pulses for more than two co-ordinate axes. A three-axis arrangement is described in the previously mentioned application by Rosenberg et al. for an Automation System. An increase in the number of co-ordinates, or axis, requires a corresponding increase in the number of bus selectors and smoothing counters.

There is also described and claimed in the previously mentioned Rosenberg et al. application structure for generating pulse trains for controlling motion along a circular path. It is shown therein how at any instant of time the ratio between the frequencies of pulse trains emerging from the dividing counter is inversely equal to their division rates. If, instead of repeatedly dividing by the same quantity, as is done in the straight-line generator, the quantty by which each dividing counter divides pulses from the generator is varied in time in accordance with a proper functon, pulse trains which can order a circle can be generated. With the modification provided by this invention, the quantity controlling the bus selectors may be varied in time in accordance with a proper function, in order to provide, as an output from the accumulator, pulse trains which can order a circle. Since it is known that the general equation for a circle with its center at point $a$, $b$, in a two-co-ordinate system is $$(x-a)^2+(y-b)^2=r^2$$

the instantaneous slope at any point on that circle is obtained by differentiating this equation, which produces $$\frac{dy}{dx}=-\frac{x-a}{y-b}$$

Making available to the respective bus selectors the quantities $x-a$ and $y-b$, the outputs from the smoothing counters will be control-pulse trains which can be employed to generate the curve.

FIGURE 6 is a block diagram of a digital-function generator for generating control-pulse trains in response to numerical inputs which can order a circle. FIGURE 5 is basically FIGURE 7 of the previously noted application to Rosenberg et al., which is modified in accordance with this invention. For the purpose of generating pulse trains which can control the motion along two co-ordinates to provide a circular path, it is necessary to know the location of the center of the circle around whose periphery the circular path is laid out, the beginning of the circular path, and the end of the circular path. This information is provided on blueprints wherever it is necessary to cut such circular path. The co-ordinates for the center of the circle may be designated by $a$, $b$; the co-ordinates for the beginning of the circular path are represented by $x_1$, $y_1$; the co-ordinates for the end of the circular path are represented by $x_2$, $y_2$.

In the operation of the embodiment of the invention shown in FIGURE 6 herein, first the input machine 160 is employed to compute the value $x_1-a$. This is the projection of a radius of the circle connected between the beginning of the circular path and the center of the circle, on the $x$ axis. This quantity and its sign are entered through the switch 162 into the x-value-and-sign register 164. This x-value-and-sign register may comprise a decade counter of the type previously described with the sign representation begin established as one or the other of the stable states of a flip-flop circuit. The quantity and sign are entered from the register 164 respectively into the x-sum reversible counter 166 and into a sign senser 168. The sign senser 168 also is a flip-flop circuit.

After the transfer of the contents of the x-value-and-sign register 164 into the x-sum counter and sign senser, respectively, the quantity $x_2-a$ is calculated, both in sign and value. This quantity is entered into the x-value-and-sign register 164 in place of $x_1-a$. This quantity is the projection on the $x$ axis of the radius connecting the end of the circular path and the center of the circle. This quantity is not transferred into the sum counter and sign senser, but is retained in the register for later use.

Next the sign and value of the quantity $y_1-b$, the projection of the y axis of the radius connecting the beginning of the circle path and the circle center, is computed and is entered through switch 162 into the y-value-and-sign register 180. From thence it is transferred respectively in value and sign into a reversible y-sum counter 182 and into the sign senser 184. Thereafter, connections between the y-sum counter and its register are opened, the quantity $y_2-b$, the projection on the y axis of the radius connecting the end of the circle path and the circle center, is calculated, and this is entered into the value-and-sign register 180.

A coincidence gate 170 compares the value of the quantity in the x-sum counter 166, and the sign of that quantity in the sign senser 168 with the sign and value of the number in the x-sign-and-value register 164. It also compares the sign of the value in the y register 180 with the sign of y represented with the sign senser 184. When the values and signs are identical, then the coincidence gate 170 will provide an output indicative of that fact to a second coincidence gate 172 and to a gate 174. The gate 174 is closed as a result, and prevents any further pulses from the smoothing counter going to ± gates 176, 178.

A coincidence gate 186 is used to compare the contents of the y-value-and-sign register 180 with the contents of the sign senser 184 and sum counter 182. It also compares the sign of the value in the x register 164 with the sign of x represented in the sign senser 168. When these are identical, an output is applied from the coincidence gate 186 to both coincidence gates 172 and 188. Coincidence gate 188 closes, as does coincidence gate 174. It prevents entry of any further pulses into ±y gates 190, 192 from the smoothing counter 158. If coincidence gate 172 has outputs from both coincidence gates 170 and 186 applied thereto, it provides an inhibit output to turn off the pulse distributor 150, thus terminating the operation of the system.

The ± gates 176, 180 and the ± gates 190, 192 will direct any input received to either the plus or the minus channel in the recording medium for the pulse train. Respective sign sensers 184, 168, by their respective outputs, representative of the sign of the number in the associated sum counters, determine which of the two gates is open. Sign senser 168 controls $y$ plus and minus gates 190, 192, and sign senser 184 controls $x$ plus and minus gates 176, 178. Thus, the sign senser for the $x$-sum counter controls the channels for the $y$ co-ordinate, and the sign senser for the $y$-sum counter controls the channels for the $x$ co-ordinate. The output of each sign senser 168, 184, which controls the respective gates, is connected to the respective gates through double-pole, double-throw reversing switches, respectively 169, 185. The purpose of these switches is to make provision for the direction of the motion with which the curved path is being generated. If a clockwise curved-path motion is required, then both switches are thrown to position "c." If a counterclockwise generation of the circular path is required, then both switches are thrown to a position "cc." These switches serve to interchange the one of the gates which is open, and thereby the track in which a pulse is recorded. Since the mechanism controlled in response to these pulses will operate in one direction in response to pulses in the positive channel and in the opposite direction in response to pulses in the negative channel, the switches on the outputs of the sign sensers can control direction of motion.

These sign sensers can be flip-flop circuits which are set from one stable condition to the other to represent a plus or minus sign, and which are operated when the associated sum counter, the sign of the contents of which is represented, passes through the zero state. Thus, in passing from a positive count to a negative count, the number in the sum counter will decrease to zero and then increase again. Also, the converse is true; that is, in going from a negative to a positive count, the number in the sum counter will decrease to zero and then increase again.

In order to enable the sum counter to operate in the manner described, that is, increase in a manner 0–1–2–3–4 when passing from a positive count through zero into the negative region, instead of the usual reversible counter operation—that is, going from +1 to zero to 999 (assuming a three-decimal counter), a reversing gate 194 is provided for the $x$-sum counter and a similar reversing gate 196 is provided for the $y$-sum counter. These reversing gates operate to apply pulses to the sum counters received from the gates with the proper intelligence. Thus, the count in the sum counter must be increased when its value is positive and pulses are received from the plus gate; the count in the counter must be increased when such count is negative and pulses are received from the minus gate; the count in the counter must be decreased when the value therein is positive and pulses are received from the minus gate; and the count in the counter must be decreased when the value therein is negative and pulses are received from the plus gate. The reversing gate 194 is controlled by sign senser 168. The reversing gate 196 is controlled by sign senser 184.

As thus far described, the system is the same as the one described and shown in the previously mentioned Rosenberg et al. application. In accordance with this invention, pulses are obtained from structure similar to that previously described in FIGURE 5. The pulse distributor 150 applies pulses to the bus selectors 152, 154 via the bus lines. However, here the selecting input to the respective bus selectors is not derived from the $x$ and $y$ registers, as was the case for the control-pulse generator for a straight line. For a circle, the bus selectors receive selection instructions from the respective $x$ and $y$ sum counters. Thus, bus selectors 152 and 154 respectively receive pulse-selection instructions from sum counter 182 and sum counter 166. Since the number contained in the respective $x$ and $y$ sum counters continuously changes, the previously indicated requirement for a curve, namely, that the control instructions to the bus selectors be varied in accordance with the requirements of the slope of the circular path, is fulfilled.

The improved straight-line and curve function generators operate more rapidly in that a plurality of control pulses can be obtained from each filling of the input counter. Heretofore, for one control pulse, it was required to wait until the number of clock pulses equalled either the number in the register or the number in the sum counter.

While the description of the embodiment of the invention has been made with reference to using beam-switching tubes as decade counters, it is to be understood that this is not to be construed as a limitation upon the invention, since other counters may be employed in place of the beam-switching tubes without departing from the spirit thereof. Neither is the fact that only a straight-line and circle function generator have been described to be contrued as a limitation on the use of this invention for the generation of control-pulse trains for other curves, since the structure and principles described are applicable for other curves and for systems using more than two co-ordinate axes. Further, acceleration of the operation of the system described may be obtained, where required, by introducing pulses directly into any one of the decade counting stages, thus effectively multiplying by a factor the contents of the counter.

There has accordingly been described herein a novel, useful, and improved arrangement for deriving control-pulse trains in response to the value of a number, which represents the length of a path along a co-ordinate for a straight line, and of the projection of a radius on a co-ordinate for a circle.

We claim:

1. In a digital function generator of the type wherein from information consisting of a number associated with each co-ordinate there are derived from a source of pulses separate control-pulse trains for directing motion along separate co-ordinates to obtain a desired resultant path, the improvement in the apparatus for deriving said pulse train from said source of pulses comprising a first counter to which pulses from said source are applied to be counted, for each co-ordinate means for deriving a plurality of pulses from said counter as it is filling, the number of pulses in said plurality equaling the value of the number associated with said co-ordinate, a second counter for counting said plurality of pulses, and means for deriving a control pulse from said second counter where it attains a predetermined count condition.

2. In a digital function generator of the type wherein, from information consisting of a number associated with each co-ordinate, there are derived from a source of pulses separate control-pulse trains for directing motion along separate co-ordinates to obtain a desired resultant path, the improvement in the apparatus for deriving said pulse trains from said source of pulses comprising a first decimal counter to which pulses from said source are applied to be counted, said decimal counter having a plurality of decade counter stages each of which is associated with a different digit position in a decimal number, for each co-ordinate means for deriving a plurality of pulses from each decade counter stage each time it fills, the number of pulses in said plurality for each counter stage equaling the value in the corresponding digit position of the number associated with the co-ordinate, a second counter for counting all said derived plurality of pulses, and means for deriving control pulses from said second counter each time it attains a predetermined count.

3. In a digital function generator of the type wherein from information consisting of a number associated with each co-ordinate, there are derived from a source of pulses separate control-pulse trains for directing motion along separate co-ordinates to obtain a desired resultant path, the improvement in the apparatus for deriving said pulse trains from said source of pulses comprising a first decimal counter to which pulses from said source are applied to be counted, said decimal counter having a plurality of decade counter stages each of which is associated with a different digit position in a decimal number, a separate plurality of bus lines associated with each decade counter stage, means for coupling each plurality of bus lines to its associated counter stages to derive a different number of output pulses on each bus line from said decade counter stage, for each co-ordinate means for deriving a plurality of pulses from each plurality of bus lines each time the associated decade counter stage fills, the number of pulses in said plurality for each counter stage equaling the value in the corresponding digit position of the number associated with the co-ordinate, a second counter, means for applying all said derived plurality of pulses to said second counter to be counted, and means for deriving control pulses from said second counter each time it attains a predetermined count.

4. In a digital function generator of the type wherein from information consisting of a number associated with each co-ordinate, there are derived from a source of pulses separate control-pulse trains for directing motion along separate co-ordinates to obtain a desired resultant path, the improvement in the apparatus for deriving said pulse trains from said source of pulses comprising a first decimal counter to which pulses from said source are applied to be counted, said decimal counter having a plurality of decade counter stages each of which is associated with a different digit position in a decimal number, a separate plurality of bus lines associated with each decade counter stage, means for coupling each plurality of bus lines to its associated counter stages to derive a different number of output pulses on each bus line from said decade counted stage, for each co-ordinate a plurality of bus-line selecting means each of which is associated with a different digit position and is coupled to a correspondingly associated plurality of bus lines, each of said bus-line selecting means including a separate input terminal associated with each value in a digit position, a single output terminal, and means responsive to a signal being applied to one of said separate input terminals to apply to said output terminal from said bus lines a number of pulses equal to the value associated with the excited input terminal, means for exciting the one of said input terminals representing the value of the digit in the corresponding digit position of the number associated with the co-ordinate, a second counter, means for coupling said output terminals to said second counter to count the output pulses received, and means for deriving a control pulse from said counter each time it attains a predetermined count.

5. A system for generating a pulse train from a source of pulses responsive to control signals representative of a number comprising a first counter coupled to said source of pulses to be driven, said counter having a plurality of decade stages each associated with a different digit position in a number, means responsive to said control signals to derive from a decade stage each time it fills a number of pulses equal to the value of the digit in the corresponding digit position of said number, a second counter, means to apply all said numbers of pulses to said second counter to be counted, and means for deriving a pulse for said pulse train from said second counter each time it attains a predetermined count value.

6. A system as recited in claim 5 wherein the lowest order decade stage of said first counter is associated with the highest-order digit position and association of the remaining decade stages in sequentially increasing order is with digit positions in sequentially decreasing order.

7. A system for generating a pulse train from a source of pulses responsive to control signals representative of a number comprising a first counter coupled to said source of pulses to be driven, said counter having a plurality of decade stages each associated with a different digit position in a number, a separate plurality of bus lines associated with each decade stage, means for applying different numbers of pulses to separate bus lines in each plurality of bus lines from its associated decade counter stage each time said decade counter stage fills a bus-line selector for each decade and associated with the same digit position as said decade, each said bus-line selector having a separate input terminal associated with each value in a digit position, a single-output terminal, and means responsive to a signal being applied to one of said separate input terminals to apply to said output terminal from said bus lines a number of pulses equal to the value associated with the excited input terminal, means for exciting all said bus-line selector input terminals with said control signals, a second counter, means for coupling all said bus-line selector output terminals to said second counter input, and means for deriving a pulse for said pulse train from said second counter each time it attains a predetermined count value.

References Cited in the file of this patent

UNITED STATES PATENTS

| | | |
|---|---|---|
| 2,005,807 | Smith | June 25, 1935 |
| 2,528,394 | Sharpless et al. | Oct. 31, 1950 |
| 2,605,967 | Stone | Aug. 5, 1952 |
| 2,611,813 | Sharpless et al. | Sept. 23, 1952 |
| 2,823,856 | Booth et al. | Feb. 18, 1958 |